Feb. 15, 1966 W. N. McDANIEL ETAL 3,235,465
FUEL ELEMENT HOLD-DOWN ARRANGEMENT FOR NUCLEAR REACTORS
Filed May 16, 1961 2 Sheets-Sheet 2
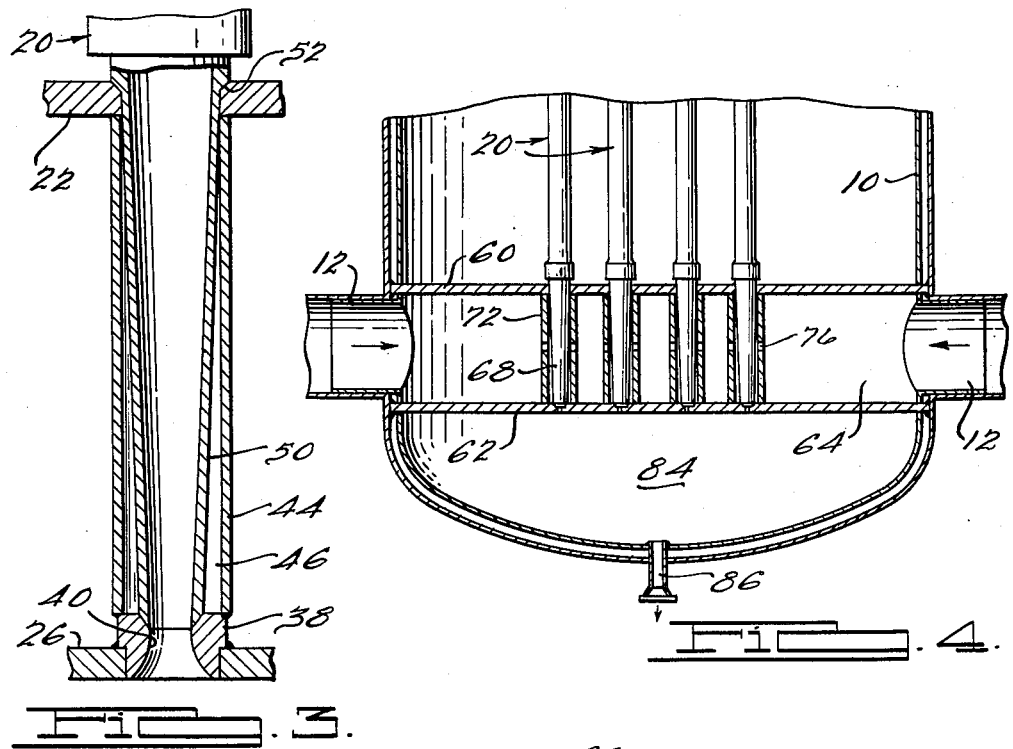
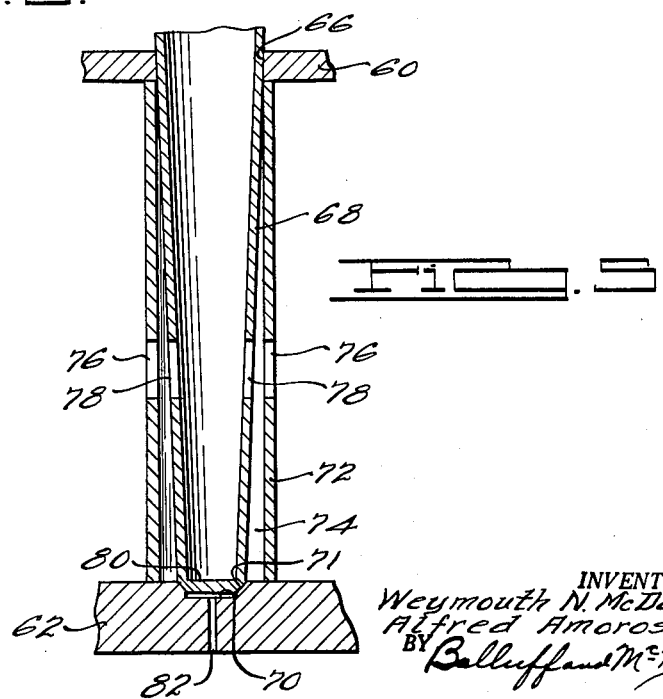
INVENTORS
Weymouth N. McDaniel,
Alfred Amorosi.
BY Balluff and McKinley
ATTORNEYS United States Patent Office  3,235,465
Patented Feb. 15, 1966

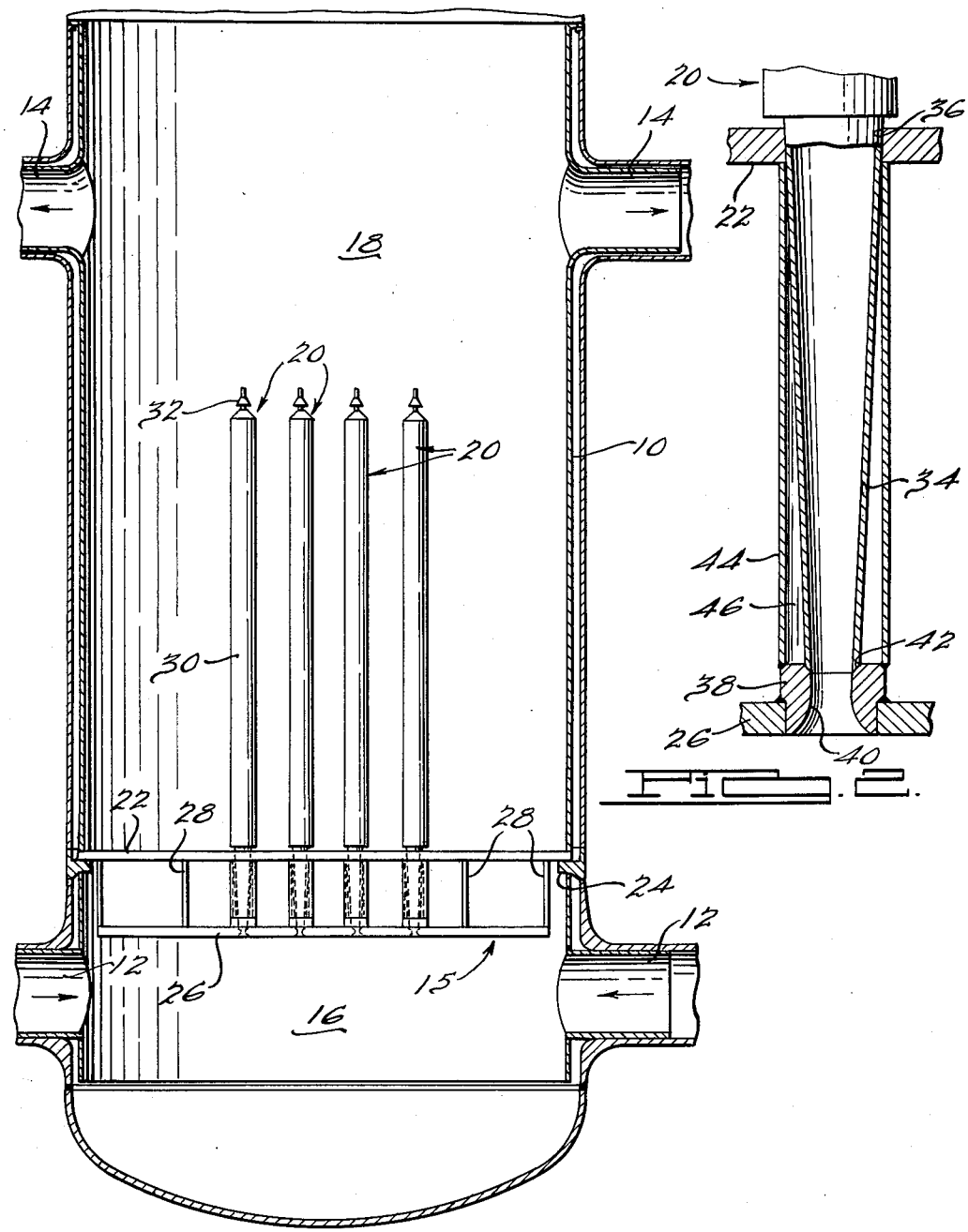

3,235,465
FUEL ELEMENT HOLD-DOWN ARRANGEMENT FOR NUCLEAR REACTORS
Weymouth N. McDaniel, Baltimore, Md., and Alfred Amorosi, Birmingham, Mich., assignors to Atomic Power Development Associates, Inc., Detroit, Mich., a corporation of New York
Filed May 16, 1961, Ser. No. 110,509
4 Claims. (Cl. 176—61)

This invention relates to nuclear reactors and has particular reference to a reactor of the type consisting of a series of fuel subassemblies each containing material useful in carrying out a controlled fission chain reaction and having passages therein through which a liquid coolant is circulated upwardly for removing heat from the reatcor. The fuel subassemblies, which may constitute either the core of the reactor or the blanket, or both, are supported at their lower ends on a support plate structure wihch separates the reactor vessel into a lower inlet plenum and an upper outlet plenum. Since these fuel elements must be periodically removed from the reactor for reprocessing or replacement, they cannot be permanently affixed to the support plate structure.

The upward flow of the liquid coolant through the fuel subassemblies exerts a drag thereon which, together with the outside pressure forces and the buoyancy of the subassembly in the liquid coolant, creates a lifting force which is greater than the weight of the subassembly. It is therefore necessary to provide some means for holding the individual subassemblies down against the support plate structure. This has been accomplished in the past by a relatively expensive and cumbersome hold-down structure which engages the upper ends of the individual fuel subassemblies or by other mechanical devices. According to the present invention, the fuel subassemblies are provided with inlet support nozzles which are seated on the support plate structure and which are so designed as to minimize the lifting force or to obtain a downwardly acting hydraulic force from the coolant flow so that the weight of the subassembly is sufficient to counteract the lifting force so that the usual mechanical hold-down structure can be eliminated.

A principal object of the invention therefore is to provide a new and improved means for holding the individual fuel subassemblies in the active portion of the reactor down against a support plate structure against the lifting forces exerted on the subassemblies by the upward flow of liquid coolant therethrough.

Another object of the invention is to provide a reactor of the type described in which the fuel subassemblies are so designed as to cause the liquid coolant flowing upwardly therethrough to exert a positive downwardly acting force on the subassembly to hold it downwardly against its support plate structure.

Other and further objects of the invention will be apparent from the following description and claims and may be understood by reference to the accompanying drawings, of which there are two sheets, which by way of illustration show preferred embodiments of the invention and what we now consider to be the best mode of applying the principles thereof. Other embodiments of the invention may be used without departing from the scope of the present invention as set forth in the appended claims.

In the drawings:

FIG. 1 is a sectional view through a nuclear reactor constructed according to the present invention;

FIG. 2 is an enlarged vertical sectional view of the inlet support nozzle of one of the fuel subassemblies shown in FIG. 1;

FIG. 3 is a view similar to FIG. 2 but showing a modified type of construction;

FIG. 4 is a fragmentary sectional view illustrating a modified form of the invention; and FIG. 5 is an enlarged sectional view of the inlet support nozzle of one of the fuel subassemblies used in the reactor shown in FIG. 4.

In FIG. 1 the reactor comprises an upright reactor vessel 10 having a series of inlets 12 at its lower end and a series of outlets 14 at its upper end for the flow of a liquid coolant, such as liquid sodium, upwardly through the reactor vessel. A support plate structure indicated generally at 15 extends across the reactor vessel above the inlets 12 to divide the reactor vessel into an inlet plenum 16 and an outlet plenum 18. A series of fuel subassemblies 20 are supported on the support plate structure and extend upwardly therefrom into the outlet plenum. Each of the fuel subassemblies is adapted to contain a series of fuel elements consisting of pins or slugs of material useful in carrying out a nuclear chain reaction and may constitute either the core or blanket of the reactor or both. While only four fuel subassemblies have been shown, there would in actual practice be a great many of such subassemblies employed in either the core or blanket.

The support plate structure 15 comprises an upper support plate 22 seated on an inwardly directed support ring 24 secured to the reactor vessel and a lower support plate 26 secured to the upper support plate 22 and spaced therefrom by a series of spacer plates 28.

The fuel subassemblies 20 each comprise an elongated outer jacket 30 containing the fuel elements therein and provided at its upper end with a handling head 32 by means of which the subassembly may be inserted into and wtihdrawn from the reactor. The subassembly 20 is provided at its lower end with an inlet support nozzle 34 in the form of a diffuser which decreases in diameter toward its lower end. The upper support plate 22 is provided with a series of apertures 36 each of which is aligned with a plug 38 which is welded or otherwise secured to the lower support plate 26 and provided with an opening therein in the form of a venturi 40, the inlet of which communicates with the inlet plenum 16. The lower end of the inlet support nozzle 34 is adapted to seat against and sealingly engage an upwardly facing conical seat 42 on the upper end of the plug 38. A sleeve 44 is secured to the plug 38 and engages the underside of the upper support plate 22. The sleeve 44 surrounds the support nozzle 34 so as to define an annular space 46 therebetween.

The fuel subassembly is provided with a passage therein communicating at its lower end with the upper end of the diffuser nozzle 34 and having an outlet at its upper end through which the liquid coolant flows upwardly from the inlet plenum to the outlet. The liquid coolant will rise to a level within the outlet plenum above the upper ends of the fuel subassemblies 20 and the outlets 14. The lifting forces exerted on the fuel subassemblies during normal operation of the reactor comprise the buoyancy of the fuel subassemblies in the pool of liquid coolant, the drag exerted on the subassemblies by the upward flow of coolant therethrough, and the outside pressure forces acting on the subassemblies. At the coolant flow velocity necessary for reactors of this type, the total lifting force exceeds the weight of the subassembly and, by means of the support nozzle construction disclosed herein, the lifting force is minimized so that the weight of the subassembly is sufficient to overcome the total lifting force so that the fuel subassemblies are held down without the necessity of employing an additional mechanical locking arrangement or mechanical hold-down structure engaging the upper end of the fuel subassemblies. The diameter of the venturi orifice 40 as compared with the outlet diameter from the diffuser 34 provides a pressure differential between these points and in effect provides a downwardly acting hydraulic force. These values can be properly selected through mathematical computations so as to obtain the desired results.

In the embodiment of the invention shown in FIG. 3 the construction is substantially identical, except that in this instance the inlet support nozzle 50 is provided with a conical shoulder 52 on its outer surface at the upper end thereof which is adapted to seat on and sealingly engage a corresponding shoulder formed on the upper support plate 22. The lower end of the nozzle 50 is not required to sealingly engage the venturi plug 38 in this case, and the space 46 between the nozzle 50 and the sleeve 44 will in this instance be subjected to the pressure at the venturi 40. If the velocity at the venturi is sufficiently high, a suction effect may be provided within the space 46 to further aid in holding down the fuel subassembly.

In the embodiment shown in FIGS. 4 and 5, the upper support plate 60 and the lower support plate 62 extend across the lower portion of the reactor vessel 10 in spaced relation to define an inlet plenum 64 between the support plates 60 and 62 communicating with the inlets 12. The upper support plate 60 is provided with a series of apertures 66 through which the inlet support nozzles 68 extend, while the lower support plate is provided with a socket or recess 70 aligned with each of the apertures 66. The lower ends of the support nozzles 68 are adapted to sealingly engage the conical surfaces 71 of the sockets 70. A sleeve 72 surrounds the support nozzle 68 of each fuel subassembly to define an annular space 74 therebetween. The sleeves 72 are provided with radial openings 76 and the support nozzles 68 are provided with similar radial openings 78. The liquid coolant flows inwardly through the openings 76 and 78 and upwardly through the support nozzles and through the fuel subassemblies 20.

The lower end of each support nozzle is closed by an end wall 80 which forms a piston having an upwardly facing surface against which the liquid coolant reacts to provide a downwardly extered hydraulic force to assist in holding the subassembly down against the support plate structure. The lower support plate 62 is provided with bleed orifices 82 which communicate the sockets 70 with a low pressure plenum 84 below the lower support plate 62. The low pressure plenum 84 may communicate by means of a conduit 86 with a low pressure source such as a pump, or the low pressure plenum 84 may be connected to any suitable source of low pressure such as the pool of sodium coolant standing in the reactor vessel above the uper support plate 60. The pressure differential provided by the bleed orifices 82 will cause the coolant in the high pressure plenum 64 to exert a downward holding force against the piston 80 so that this force, together with the weight of the subassembly will be sufficient to overcome the combined lifting forces acting on the subassembly. The pressure differential also improves the seal between the nozzles 68 and the support plate 62. In the arrangement shown in FIG. 5, the lower end of the support nozzle 68 is adapted to seal against the lower support plate 62, although the seal could be provided at the upper support plate 60 if desired.

The present invention therefore provides an extremely simple but effective arrangement for holding the individual fuel elements down against the support plate structure without the necessity of complicated and expensive mechanical locking devices at the support plate structure or the mechanical hold-down arrangements commonly employed at the upper ends of the fuel subassemblies. It will be apparent that the hydraulic hold-down arrangement described herein may take many different forms, particularly in the case of the piston hold-down shown in FIGS. 4 and 5 since it is only necessary to use a construction in which a piston is subjected to a sufficient pressure differential on its upper and lower surfaces to obtain the downwardly directed force required to supplement the weight of the subassembly to insure that it will not tend to rise due to the flow of coolant upwardly therethrough.

While we have illustrated and described preferred embodiments of our invention, it is understood that these are capable of modification, and we, therefore, do not wish to be limited to the precise details set forth but desire to avail ourselves to such changes and alterations as fall within the purview of the following claims.

We claim:

1. A nuclear reactor comprising: a reactor vessel having a lower inlet and an upper outlet for circulation of a liquid coolant upwardly therethrough, a support plate spanning said vessel and partitioning the same into lower and upper plenums communicating with said inlet and outlet, respectively; a series of tube-encased fuel subassemblies removably supported in upstanding relation on said plate, said tubes having tapered lower ends of downwardly and progressively decreasing section, projecting through apertures of said plate and into said lower plenum; a fixedly mounted plug, said tapered lower tube end seating on said plug, said lower tube and said plug coacting to form a converging-diverging inner tubular wall opening into said lower plenum, said tube and said plug being separable at the throat of said inner tubular wall.

2. A nuclear reactor comprising: a reactor vessel having a lower inlet and an upper outlet for circulation of a liquid coolant upwardly therethrough, a support plate structure including a lower support plate and an upper support plate spanning said vessel and partitioning the same into lower and upper plenums communicating with said inlet and outlet, respectively; a series of tube-encased fuel subassemblies removably supported in upstanding relation on said support plate structure, said tubes having tapered lower ends of downwardly and progressively decreasing sections, projecting through apertures in said upper support plate, a plug fixedly mounted on said lower support plate, said tapered lower tube end seating on said plug, said lower tube and said plug coacting to form a converging-diverging inner tubular wall opening into said lower plenum, said tube and said plug being separable at the throat of said inner tubular wall, and a sleeve of substantially constant section encasing said tapered tube and having the lower end thereof secured to said plug and having the upper end thereof engaging said upper support plate adjacent one of said apertures to form an annular space between said sleeve and said tapered lower end, means for reducing the pressure in said annular space between said sleeve and said tapered lower end with respect to said lower plenum.

3. A nuclear reactor comprising: a reactor vessel having a lower inlet and an upper outlet for circulation of a liquid coolant upwardly therethrough, a support plate structure including a lower support plate and an upper support plate spanning said vessel and partitioning the same into lower and upper plenums communicating with said inlet and outlet, respectively, a series of tube-encased fuel subassemblies removably supported in upstanding relation on said support plate structure, said tubes having tapered lower ends of downwardly and progressively decreasing section, projecting through apertures of said upper support plate, a plug fixedly mounted on said lower support plate, said tapered lower tube end seating on said plug, said lower tube and said plug coacting to form a converging-diverging inner tubular wall opening into said lower plenum, said tube and said plug being separable at the neck of said inner tubular wall, and a sleeve of substantially constant section encasing said tapered tube and having the lower end thereof secured to said plug and having the upper end thereof engaging said upper support plate adjacent one of said apertures to form an annular space between said sleeve and said tapered lower end, the clearance between said tapered lower end and said aperture being sufficient to allow said liquid coolant to flow therethrough from said upper plenum to equalize the fluid pressure between said annular space and the upper plenum.

4. A nuclear reactor comprising: a reactor vessel having a lower inlet and an upper outlet for circulation of a liquid coolant upwardly therethrough, a support plate structure including a lower support plate and an upper support plate spanning said vessel and partitioning the same into lower and upper plenums communicating with said inlet and outlet, respectively; a series of tube-encased fuel subassemblies removably supported in upstanding relation on said support plate structure, said tubes having tapered lower ends of downwardly and progressively decreasing section, projecting through apertures in said upper support plate, said tapered lower end being adapted to sealingly engage said upper support plate, a plug fixedly mounted on said lower support plate, said tapered lower tube end loosely seating on said plug, said lower tube and said plug coacting to form a converging-diverging inner tubular wall opening into said lower plenum, said tube and said plug being separable at the neck of said inner tubular wall, and a sleeve of substantially constant section encasing said tapered tube and having the lower end thereof secured to said plug and having the upper end thereof engaging said upper support plate adjacent one of said apertures to form an annular space between said sleeve and said tapered lower end, the seating between said tapered lower end and said plug being such as to allow said liquid coolant to flow therethrough to equalize the hydraulic pressure contained in said annular space and that appearing at the throat of said inner tubular wall.

References Cited by the Examiner

UNITED STATES PATENTS

| | | | |
|---|---|---|---|
| 2,868,706 | 1/1959 | Untermyer et al. | 176—32 |
| 2,936,273 | 5/1960 | Untermyer | 60—108 |
| 2,968,601 | 1/1961 | Evans et al. | 176—73 |
| 2,990,349 | 6/1961 | Roman | 176—42 |
| 2,999,059 | 9/1961 | Treshow | 176—42 |
| 3,070,537 | 12/1962 | Treshow | 176—78 |
| 3,087,881 | 4/1963 | Treshow | 176—54 |

OTHER REFERENCES

Koch et al., Proceedings of the Second United Nations International Conference on the Peaceful Uses of Atomic Energy, volume 9, September 1958, pages 323–347.

CARL D. QUARFORTH, *Primary Examiner.*

OSCAR R. VERTIZ, *Examiner.*